Dec. 6, 1927.

C. C. CHENEY 1,651,511

LAWN SPRINKLER

Filed Sept. 6, 1923

Inventor.
Charles C. Cheney
by Heard Smith & Tennant
Attys.

Dec. 6, 1927.  1,651,511
C. C. CHENEY
LAWN SPRINKLER
Filed Sept. 6, 1923   2 Sheets-Sheet 2

Inventor.
Charles C. Cheney
by Heard Smith & Tennant.
Attys.

Patented Dec. 6, 1927.

1,651,511

UNITED STATES PATENT OFFICE.

CHARLES C. CHENEY, OF CHARLESTOWN, MASSACHUSETTS.

LAWN SPRINKLER.

Application filed September 6, 1923. Serial No. 661,138.

This invention relates to a lawn sprinkler of the type having a stationary member which rests on the ground to support the sprinkler and a rotatable sprinkling member from which water is sprayed on the surrounding lawn.

In lawn sprinklers of this type it is desirable to keep the bearing as free from water as possible to prevent the bearing surfaces from rusting in order that the sprinkler will function properly when used after a period of idleness. It is an object of the present invention to provide a lawn sprinkler in which the bearing by which the rotatable sprinkling member is supported on the stationary member is so positioned that water does not enter the bearing.

It is a further object of the invention to provide a water collecting chamber between the water passages of the lawn sprinkler and the bearing by which the rotatable sprinkling member is supported on the stationary member to collect any water which may leak toward the bearing and to provide means for discharging the water from said collecting chamber to keep the water away from said bearing.

Another object of the invention is to provide a lawn sprinkler having a stationary member and a rotatable sprinkling member with a bearing which may rotate with a minimum amount of friction.

A further object of the invention is to provide a lawn sprinkler having a stationary member and a sprinkling member rotatably supported on the stationary member by a bearing, with means to pack the bearing with grease from the outside of the sprinkler.

A further object of the invention is to provide a lawn sprinkling member with means by which the speed of rotation of the sprinkling member may be controlled independent of the pressure of the water flowing through the sprinkler to vary the distance to which the stream of water will be thrown.

Other objects and features of the invention will more fully appear from the following description and the accompanying drawings.

In order to give an understanding of the invention I have illustrated in the drawings a selected embodiment thereof which will now be described, after which the novel features will be pointed out in the appended claim.

The drawings illustrate in section and elevation a preferred construction of a lawn sprinkler and embody the broad principles of the invention.

Figure 1:
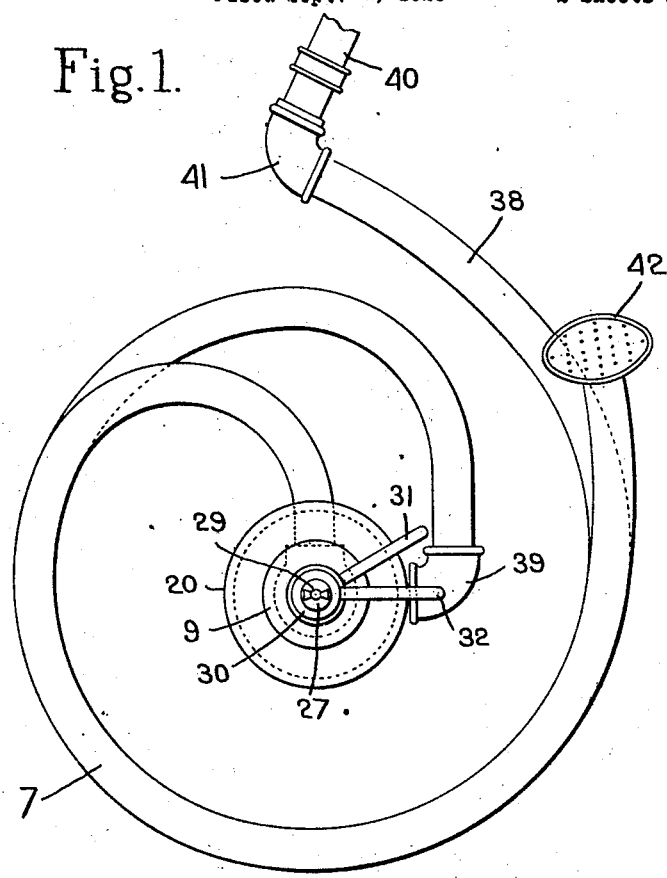
Fig. 1 is a plan view of the lawn sprinkler.

As illustrated herein the lawn sprinkler comprises a stationary member designated generally at 1 and a rotatable sprinkling member designated generally at 2.

The stationary member comprises a stationary hollow spindle 3 having a water inlet 4 and a water outlet 5. The rotatable sprinkling member comprises a sleeve 6 rotatably mounted on the spindle and a tubular sprinkler arm 7 carried by said sleeve communicating with the said water outlet of the spindle. In order to permit the free flow of water from the water outlet of the spindle, said water outlet is formed by a plurality of openings through the walls of the spindle and the sleeve is enlarged to provide a chamber 8 which surrounds the water outlet openings so that the water may at all times pass from the outlet openings into the chamber. The tubular sprinkling arm is connected to the chamber 8 through a threaded opening formed in the rotatable sleeve.

The sprinkling member is rotatably carried on the stationary member by means of a bearing so positioned that it is above the water passages in the sprinkler in order that water flowing through the passages may not easily enter the bearing. The bearing comprises a stationary bearing flange 9 carried by the spindle above the water passages in the spindle and a rotatable bearing flange 10 carried by the sleeve in such a position that it lies adjacent the stationary bearing flange carried by the spindle and above said water passages. In order to provide a bearing which has as little friction as possible ball bearings 11 or other suitable devices are interposed between the stationary bearing flange and the rotatable bearing flange. The stationary bearing flange is provided with a depending edge 12 to which is secured a bearing ring 13 which extends under and engages with a shoulder 14 on the rotatable bearing flange. For simplicity in construction and ease of assembling, the bearing ring 13 and the depending edge 12 of the stationary bearing flange are provided with co-operating threads so that the bearing ring may be screwed into the said depending edge.

In order to permit the sprinkling member to freely rotate on the stationary member, the outer surface 15 of the stationary member is finished to give a bearing surface and the rotatable sprinkling member is provided with a bearing surface 16 for co-operation with the bearing surface 15 of the stationary member.

Figure 3:
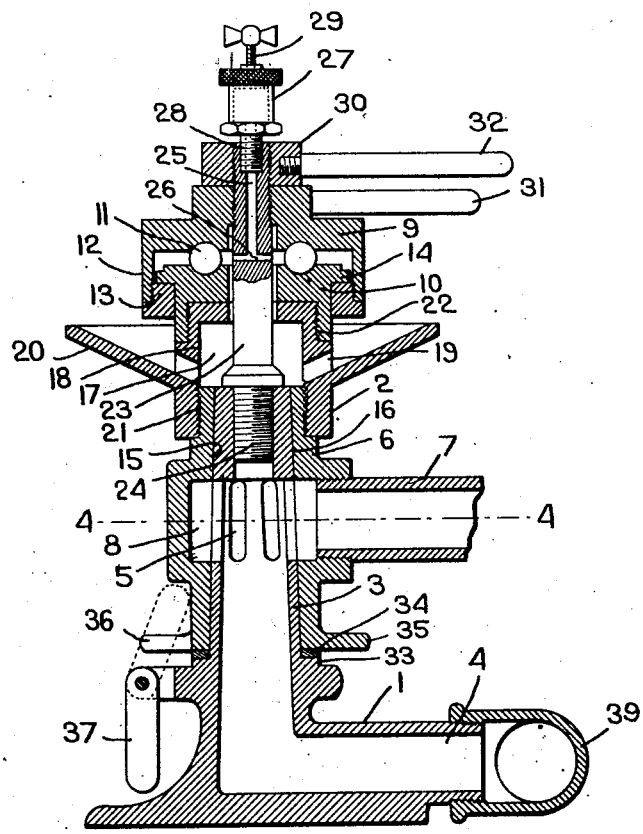
Fig. 3 is a vertical sectional view of the lawn sprinkler.
Figure 4:
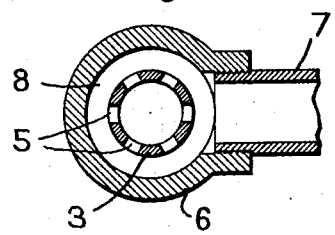
Fig. 4 is a section on line 4—4, Fig. 3.

It is obvious that some water will leak upwardly between the two bearing surfaces toward the ball bearings 11 and to prevent this water from reaching the said ball bearings the rotatable member is provided with a water collecting chamber 17 between the water outlet and the ball bearings. This water collecting chamber is formed by a casing member 18 carried by the sleeve between the water outlet and the bearing flanges 9 and 10. As shown in Fig. 3 the casing member surrounds the spindle and is spaced therefrom. To permit the discharge of the water as soon as it enters the chamber 17 the casing member has a plurality of openings 19 through the walls thereof to the outside of the sprinkler. To throw the water away from the openings 19 a discharge flange 20 extends from the casing 18 below the openings 19 and rotates with the casing whereby any water which passes through the discharge openings onto the discharge flange is thrown away from the spindle by centrifugal force. The openings 19 are numerous enough and large enough to permit the discharge of all the water which may at any time during the normal operation of the sprinkler leak upwardly from the water passages toward the ball bearings 11 and the discharge flange has such a diameter that it throws the water coming out of the openings 19 to a considerable distance from the sprinkler. In the preferred form of construction the casing is connected to the sleeve 6 by threads 21 and the rotatable bearing flange 10 is connected to the casing member by threads 22.

The spindle has an upper portion 23 fastened in the lower portion of the spindle by threads 24 and the stationary bearing flange is supported from this upper portion of the spindle. In order to grease the ball bearings 11 the upper portion 23 of the spindle contains a central aperture 25 extending longitudinally thereof from the end toward the center and an aperture 26 transverse of the spindle communicating with the central aperture and with the space containing the ball bearings. Thus grease may be forced down the central aperture and through the transverse aperture to grease the bearings. To facilitate the greasing of the bearings a grease or oil cup 27 is carried by the spindle and communicates with the central aperture. The grease or oil cup may be of any form and is shown herein as having a neck 28 which is threaded into the central aperture and a screw 29 by means of which the grease may be forced from the grease cup down through the apertures and into the bearings. With this construction the bearings may be greased from the outside of the sprinkler and the grease may be forced into the bearings under such pressure that it prevents any water from entering the bearings should the water fill the chamber 17 and tend to move upwardly into the bearings.

A feature of the invention is the fact that the speed of rotation of the rotatable sprinkling member may be controlled independently of the water pressure in order that the area sprinkled may be varied without changing the pressure of the water which would cause a change in the amount of water distributed. In order to control the speed of rotation of the sprinkling member the bearing surface 15 of the stationary member is shaped like the frustum of a cone with the small end of the cone at the top. The bearing surface of the rotatable sprinkling member has such a shape that it fits against the bearing surface of the stationary member. It will thus be seen that if the rotatable sprinkling member is forced downwardly the said bearing surfaces are forced against one another with the result that the friction between the two bearing surfaces causes the speed of rotation of the rotatable sprinkling member to decrease. In order to force the bearing surfaces together the top of the upper portion 23 of the spindle is threaded and the stationary bearing flange is provided with threads to co-operate with said threads on the top of the spindle. Thus if the stationary bearing flange is rotated in the proper direction pressure is transmitted through the balls 11 to the sleeve 6 and forces the sleeve downwardly, thus forcing the bearing surfaces 15 and 16 against one another and slowing down the rotation of the sprinkling member. In order to retain the stationary bearing flange 9 in any position to which it is moved a lock nut 30 is threaded on the upper part of the spindle above the stationary bearing flange so that the lock nut may be forced against the flange to hold it in position. Handles 31 and 32 extend from the stationary bearing flange and the lock nut respectively to facilitate the movement of these parts.

The friction between the two bearing surfaces may not be sufficient to retard the rotation of the sprinkling member as much as is desired and therefore the stationary member is provided with a shoulder 33 projecting therefrom adjacent the bottom of the rotatable member. The shoulder 33 may be so positioned with regard to the bottom of the rotatable member that when the bearing surfaces are in contact, the shoulder 33 is also in contact with the bottom of the rotatable member. It is deemed preferable, however, to so position the shoulder with regard to the bottom of the rotatable member that friction rings 34 of various thicknesses may be positioned between the shoulder 33 and the bottom of the rotatable member so that the bottom of the rotatable member will engage the friction ring either before, during, or after the bearing surfaces have come in contact depending upon the thickness of the rings.

In order that the rotatable member may be locked to the stationary member so as to prevent rotation, the rotatable member is provided near its bottom with a locking flange 35 which has a slot 36 therein and a locking member 37 is pivoted to the stationary member in such a position that it may be swung into the slot, as shown in dotted lines in Fig. 3, thereby locking the rotatable member against rotation.

Figure 2:
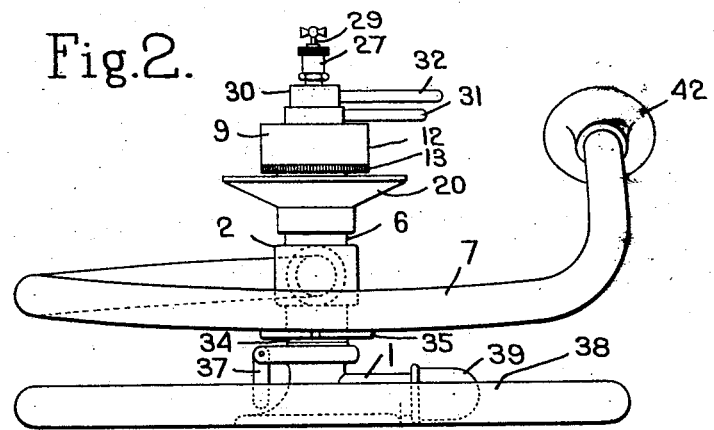
Fig. 2 is a side elevation of the lawn sprinkler.

The stationary member is supported in its upright position by means of a base which may conveniently be a rigid water-conveying pipe 38 through which water is brought to the inlet 4 of the stationary member. The pipe 38 is connected to the stationary member by means of a suitable fitting 39 and is connected to the garden hose or other source of water supply 40 by means of another fitting 41. The tubular sprinkling arm is provided with any suitable sprinkling head 42 which is shown in the drawings as an enlarged head having a plurality of small openings so that the water issuing therefrom will be in the form of a spray. The sprinkling member is rotated by the action of the water issuing from the sprinkling head. Any number of sprinkling arms may be used on the rotatable sprinkling member but if only one arm is used it is preferably made as shown in Figs. 1 and 2 of the drawings in order that the rotatable sprinkling member may be evenly balanced and thus freely rotate on the spindle.

From the above description it will be seen that a sprinkler is provided having a rotatable sprinkling member which may rotate at various speeds or which may be entirely locked against rotation. In order to permit the free rotation of the sprinkling member the locking member 37 is placed in such a position that it does not interfere with the rotation of the sprinkling member and the stationary bearing flange is raised on the spindle, thereby raising the sleeve 6 so that the bearing surfaces 15 and 16 and the bottom of the sleeve and the shoulder 33 contact very slightly if at all. When the sleeve is thus raised a small amount of water may leak between the bearing surfaces 15 and 16 toward the ball bearings 11. This is desirable in that the water provides a frictionless bearing between the bearing surfaces 15 and 16, but is undesirable for the reason that the water might reach the ball bearings 11, and in order to discharge this water the water collecting chamber and the discharge flange have been provided. The only surfaces which may retard the free rotation of the rotatable sprinkling member are then the contacting surfaces of the bearing ring 13 and the shoulder 14 of the rotatable bearing flange. These surfaces are thoroughly lubricated by the grease which is packed around the ball bearings 11 and flows toward the outer edge of the bearing space in which the ball bearings lie. The rotation of the sprinkling member may be retarded to any desired degree by forcing the stationary bearing flange downwardly and causing the bearing surfaces 15 and 16 to frictionally contact and the bottom of the sleeve 6 to frictionally contact with the shoulder 33 or the friction ring 34. All movement of the rotatable sprinkling member may be stopped by causing the locking member 37 to fit in the slot 36.

The parts of the lawn sprinkler may be made of any suitable material. As above stated, the tubular sprinkler arm 7 and the water-conveying pipe 38 may be ordinary iron pipe of suitable size. The other parts of the lawn sprinkler may be iron or any other suitable material. In order to give the device a finished appearance the handles 31 and 37, the sprinkler head 42 and the grease cup 27 may be either brass or nickel plated material. Although a particular and preferred form of the invention has been described, modifications may be made and the invention is to be construed as broadly as the limitations in the claim, taken in conjunction with the prior art, may allow.

Having thus described the invention what is claimed as new and desired to be secured by Letters Patent is:

A lawn sprinkler comprising a stationary hollow spindle having a water inlet and a water outlet, a sleeve rotatably mounted on said spindle, a tubular sprinkler arm carried by said sleeve communicating with the water outlet, a stationary bearing flange carried by the spindle above said inlet and outlet, a rotatable bearing flange carried by the sleeve, a casing member carried by the sleeve between the water outlet and said bearing flanges and revolving with the sleeve, said member surrounding the spindle and spaced therefrom and having openings through the walls thereof to the outside of the sprinkler, and a discharge flange extending from said casing below said openings and rotating therewith, whereby water leaking between the spindle and sleeve toward the bearing is caught within said casing and discharged through the openings onto said discharge flange from which it is thrown by centrifugal force.

In testimony whereof, I have signed my name to this specification.

CHARLES C. CHENEY.